May 3, 1949.  J. MOREAU  2,468,994
AUTOMATICALLY CORRECTED MEANS FOR
REMOVING BEETROOT TOPS
Filed March 12, 1947

Inventor
Jean Moreau
By Clascut Downing, Seebold
Attys

Patented May 3, 1949

2,468,994

UNITED STATES PATENT OFFICE 2,468,994

AUTOMATICALLY CORRECTED MEANS FOR REMOVING BEETROOT TOPS

Jean Moreau, Noyelles-sur-Escaut, France

Application March 12, 1947, Serial No. 734,002
In France March 24, 1939

Section 1, Public Law 690, August 8, 1946
Patent expires March 24, 1959

5 Claims. (Cl. 55—107)

The present invention relates to a device for removing the tops of beetroots, with an automatic corrector for the top-removal, consisting essentially of a carriage or frame carried by an articulated parallelogram supporting a concave, circular top-removing knife driven by the machine and a tread belt member which precedes the top-removing knife and which makes contact with the heads of the beetroots, characterised by the feature that the tread belt member is driven at a speed of advance slightly in excess of the advance of the machine and is suspended from a system of levers articulated so as to regulate the height of the top-removal.

The accompanying drawings show diagrammatically, by way of example only, one constructional form of the invention.

In machines for digging up beetroots, various arrangements have been used for regulating the removal of the tops of the beetroots before digging them up. These arrangements are generally rollers or discs in contact or even tread belt members which make contact with the beetroots and roll over the latter, and, in rising, raise the knife arrangement, which cuts off the top of the beetroot.

All these arrangements, however, have the disadvantage of depressing the beetroots if the machine advances too quickly and the top-removing process is not satisfactory.

In these arrangements, moreover, the height of the top-removal is adjusted for a definite crop. The result of this is that the collar slice varies more or less according to the diameter of the beetroot and the covering of leaves, so that the uniformity is more theoretical than practical. In addition, when the beetroot protrudes more from the ground, the system of vegetation of the leaves differs in marked degree from that of a beet the root of which lies deeper: the higher the beet, the greater is the tendency to have leaves growing round the summit of the root, a tendency which is still more accentuated with certain varieties. If then the top-removing is adjusted to remove the leaves from the large tops of the protruding beetroots, those beetroots that are level with the ground and have a small top will be cut too deeply; and conversely.

The purpose of the present invention is to provide improvements intended to obviate these disadvantages.

Figure 1:
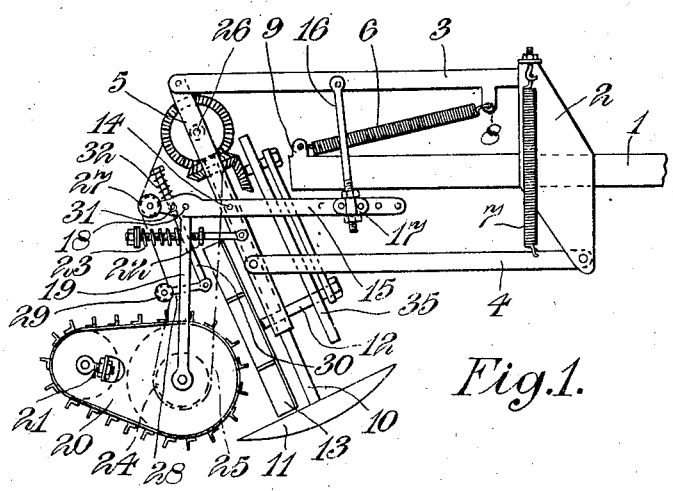
Figure 1 is a side view of the device for removing the tops of the beetroots, with an automatic corrector of the top-removal, and with an arrangement for discharging the leaves and the beet tops, termed a vane disc.
Figure 2:
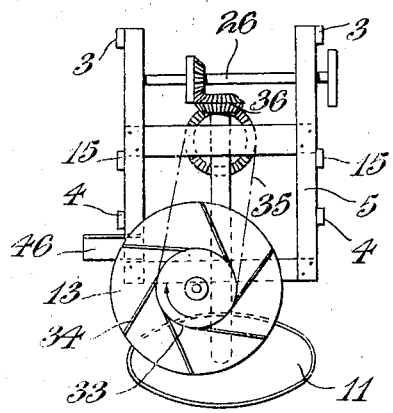
Figure 2 is a front view of the same arrangement, in which the tread belt member and its support have been removed.

Figure 1 shows in side elevation the top-removing arrangement, in which, in order to avoid complicating the drawing, the manner of suspension of the arrangement on the machine frame has been shown diagrammatically, the majority of the suspension and articulation parts being symmetrical with relation to a vertical axial plane. At 1 is shown part of one of the longitudinal bearers of the beetroot digging machine. On this longitudinal bearer is fixed a flat iron plate 2 of suitable shape, at the ends of which are articulated frame members 3 and 4, which, seen in side elevation, form an articulated parallelogram with the top-removing frame member 5, the movements of this parallelogram being damped by springs 6 and 7. One end of the spring 6 is fixed to a lug 8 on the frame member 3 and the other end to a lug 9 on the longitudinal bearer of the machine 1. One end of the spring 7 is hooked on to the lower frame member 4 and the other end is hooked on to the apex of the metallic plate 2. The tension of each spring can be regulated in order to obtain the required pressure of the tread belt member on the tops of the beetroots.

The frame 5 acts as support and guide to the shaft 10 of the top-removing knife properly so called, which consists of a concave disc 11. It likewise serves as support and guide to the shaft 12 of a disc 13, provided with vanes, which is designed to discharge the beet tops and the leaves. To each strut of this frame 5 there is pivoted at 14 a lever 15, one part of which is extended towards the rear of the top-remover, in the same direction as the frame members 3 and 4, and the other part towards the front of the top-remover. On each of the two longitudinal parts of the frame member 3 is articulated a link rod 16, the length of which is adjustable at 17 by means of a suitable arrangement on the lever 15; a suitable device makes it likewise possible to alter this articulation point 17 on the arm of the lever 15.

On the other part of each of the levers 15 there is articulated at 18 one of the struts 19 of the frame supporting the tread belt arrangement 20. This tread belt member is formed essentially by two large pinions mounted on a driven shaft and two smaller pinions mounted freely. Two parallel chains mesh with these pinions, these chains being connected together by means of angle bars with unequal sides, the smaller flanges being on the outside. An adjusting arrangement 21 makes it possible to tension the chains carrying the angle bars.

The oscillating movements of the caterpillar support are limited on one side by means of an adjustable stop 22, a nut for example, arranged on a rod carrying a spring 23, which limits and damps the oscillations in the reverse direction. The advance of this tread belt member is ensured by a pinion 24 keyed to the driving shaft of the large pinions inside the tread belt member, this shaft being driven by a chain 25, which in its turn is actuated by a pinion keyed to a driving shaft 26, which receives motive power from the main driving shaft of the machine.

This tread belt member or self-laying track being driven at a uniform speed in excess of the advance of the machine makes progressive contact on the heads of the beetroots without depressing them, but on the contrary with a tendency to draw them towards the knife. As this force cannot take effect so long as the top of the beetroot is uncut, it results in the advance of the tread belt member, the bearing frame 19 of which pivots about the axis 18, compressing the springs 23. As soon as the top is severed the tread belt member is still for a short time in contact with the top, and under the influence of the springs 23 this top is forcibly urged towards the discharging arrangement 13 for the leaves, and the tread belt member reassumes its former position ready for a fresh operation.

If the tread belt member rises on a high beetroot, which should in consequence be cut more deeply, the tread belt member acts in the sense of lifting the entire top-remover but the knife 11 does not rise by the same amount as the tread belt member for owing to the alteration in the angle formed by the axis of rotation of the knife and the frame 3, the lever 15 has pivoted on its axis 14 by a certain amount, which has made it possible to accentuate the space between the lower part of the tread belt member and the leading edge of the knife, and consequently to cut a larger slice of the top.

Owing to the regulation which is possible of the articulation 17 either in the direction of the lever 15 or in the direction of the link 16, it will be possible, according to the variety of beet, to vary the amplitude of the movement and modify the top-removing.

The distance between the axis of the gears of the tread belt member and the axis of the driving gears being variable, it has been necessary to provide a device for compensating the tension of the chain 25. For this purpose, the end of one of the levers 15 comprises a tensioning roller 27. A little lower down on the frame supporting the tread belt member is articulated a small lever 28, carrying at its end a roller 29 and articulated at its other end to a rod 30, which can slide in an eyelet pivoting at 31 on the lever 15. A spring 32 suitably adjusted causes the roller 29 to act as a tensioning element.

The vane disc has a flat plate 33 forming an annulus and welded concentrically to the disc. This ring has the function of stopping the leaves in their rising movement produced by the advance of the tread belt member. From this ring other flat plates 34 branch off towards the periphery these being of the same width as the central ring, and being arranged obliquely in relation to the radii of the disc, so as to drive off the tops and the leaves.

This vane disc, mounted on the shaft 12, receives its rotary movement through a chain 35, which meshes with a toothed wheel 36, which is actuated through an arrangement of bevel wheels by the driving shaft 26, which receives its motive force from the main driving shaft of the machine. The direction of rotation of the vane disc is indicated by the arrow. A metallic part 46 bent downwards and fixed to the frame 5 prevents the tops and the leaves from being projected upwards.

I claim:

1. For attachment to a beetroot digging machine, means for removing beetroot tops, comprising: an articulated parallelogram having members oscillatably mounted on the digging machine, supporting frame members carried by the articulated parallelogram, a circular, concave top-removing knife rotatably supported by the said supporting frame members, means for transmitting rotary motion from the digging machine to the top-removing knife, a pair of forwardly and rearwardly extending levers fulcrumed on the supporting frame members, struts pivoted to and extending downwards from the leading ends of the said levers, a self-laying track carried by the said struts in advance of the top-removing knife, means for driving the self-laying track at a speed slightly greater than the speed of travel of the digging machine so that it tends to draw the tops of the beetroots backwards towards the top-removing knife, pivoted links connecting the rearwardly extending arms of the levers to the articulated parallelogram, and means for varying the effective length of the rearwardly extending arms of these levers.

2. For attachment to a beetroot digging machine, means for removing beetroot tops, comprising: an articulated parallelogram having members oscillatably mounted on the digging machine, supporting frame members carried by the articulated parallelogram, a circular, concave top-removing knife rotatably supported by the said supporting frame members, means for transmitting rotary motion from the digging machine to the top-removing knife, a pair of forwardly and rearwardly extending levers fulcrumed on the supporting frame members, struts pivoted to and extending downwards from the leading ends of the said levers, a self-laying track carried by the said struts in advance of the top-removing knife, means for driving the self-laying track at a speed slightly greater than the speed of travel of the digging machine so that it tends to draw the tops of the beetroots backwards towards the top-removing knife, pivoted links connecting the rearwardly extending arms of the levers to the articulated parallelogram, and means for varying the effective length of the rearwardly extending arms of these levers, rods extending forward from the supporting frame members past the downwardly extending struts, adjustable stops on the said rods to limit the rearward swing of the said struts, and springs interposed between the front ends of the said rods and the front of the struts to damp and limit the forward swing of the struts and to impart to them a rearward impulse as soon as the top of a beetroot has been cut.

3. For attachment to a beetroot digging machine, means for removing beetroot tops, comprising: an articulated parallelogram having members oscillatably mounted on the digging machine, supporting frame members carried by the articulated parallelogram, a circular, concave top-removing knife rotatably supported by the said supporting frame members, means for transmitting rotary motion from the digging machine to the top-removing knife, a pair of forwardly and rearwardly extending levers fulcrumed on the supporting frame members, struts pivoted to and extending downwards from the leading ends of the said levers, a self-laying track carried by the said struts in advance of the top-removing knife, chains for driving the self-laying track at a speed slightly greater than the speed of travel of the digging machine so that it tends to draw the tops of the beetroots backwards towards the top-removing knife, tensioning levers pivoted to the struts, tensioning rods pivotally connected to the rear ends of the tensioning levers, jockey pulleys mounted on the front ends of the tensioning levers meshing with the chains that drive the self-laying track, and springs urging the tensioning rods in such a direction as to press the jockey pulleys against the driving chains.

4. For attachment to a beetroot digging machine, means for removing beetroot tops, comprising: an articulated parallelogram having members oscillatably mounted on the digging machine, supporting frame members carried by the articulated parallelogram, a circular, concave top-removing knife rotatably supported by the said supporting frame members, means for transmitting rotary motion from the digging machine to the top-removing knife, a pair of forwardly and rearwardly extending levers fulcrumed on the supporting frame members, struts pivoted to and extending downwards from the leading ends of the said levers, a self-laying track carried by the said struts in advance of the top-removing knife, means for driving the self-laying track at a speed slightly greater than the speed of travel of the digging machine so that it tends to draw the tops of the beetroots backwards towards the top-removing knife, and means arranged between the self-laying track and the top-removing knife for discharging the severed tops and leaves.

5. Means for removing beetroot tops as claimed in claim 4, the discharging means comprising: a metallic vane disc rotatably mounted on the supporting frame members, a flat iron ring concentrically attached to the vane disc, flat iron vanes extending outwards from the flat iron ring to the periphery of the vane disc at an inclination to the radii of the vane disc, and means for transmitting rotary motion to the vane disc.

JEAN MOREAU.

No references cited.